(12) United States Patent
Dewan (10) Patent No.: US 8,063,781 B2
(45) Date of Patent: Nov. 22, 2011

(54) SECURE RFID PACKAGING

(75) Inventor: Sunil Dewan, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 1251 days.

(21) Appl. No.: 11/428,899

(22) Filed: Jul. 6, 2006

(65) Prior Publication Data

US 2007/0010213 A1    Jan. 11, 2007

Related U.S. Application Data

(60) Provisional application No. 60/697,288, filed on Jul. 6, 2005.

(51) Int. Cl.
 *G08B 13/14* (2006.01)
 *G06K 5/00* (2006.01)
(52) U.S. Cl. .................................... 340/572.1; 235/380
(58) Field of Classification Search .................. 340/500, 340/540, 568.1, 572.1–572.9, 10.1, 571; 235/375–385
See application file for complete search history.

(56) References Cited

U.S. PATENT DOCUMENTS

| | | | |
|---|---|---|---|
| 5,151,684 A | 9/1992 | Johnsen | |
| 5,218,343 A | 6/1993 | Stobbe et al. | |
| 5,929,760 A * | 7/1999 | Monahan | 340/572.7 |
| 5,971,587 A | 10/1999 | Kato et al. | |
| 6,008,727 A * | 12/1999 | Want et al. | 340/572.1 |
| 6,040,773 A * | 3/2000 | Vega et al. | 340/572.1 |
| 6,121,544 A * | 9/2000 | Petsinger | 174/353 |
| 6,200,630 B1 * | 3/2001 | Eriksson | 427/123 |
| 6,275,745 B1 | 8/2001 | Critelli et al. | |
| 6,557,758 B1 * | 5/2003 | Monico | 235/380 |
| 6,816,075 B2 * | 11/2004 | Grunes et al. | 340/572.1 |
| 6,853,345 B2 | 2/2005 | King et al. | |
| 7,051,925 B2 * | 5/2006 | Schwarz, Jr. | 235/375 |
| 7,055,750 B2 * | 6/2006 | Carrender | 235/472.01 |
| 7,360,714 B2 * | 4/2008 | Sano et al. | 235/492 |
| 2003/0057276 A1 * | 3/2003 | Appalucci et al. | 235/382 |
| 2005/0099292 A1 | 5/2005 | Sajkowsky | |
| 2006/0028319 A1 | 2/2006 | Kean et al. | |
| 2006/0032909 A1 * | 2/2006 | Seegar | 235/380 |
| 2006/0290501 A1 * | 12/2006 | Hammad et al. | 340/572.1 |

\* cited by examiner

*Primary Examiner* — James Yang
(74) *Attorney, Agent, or Firm* — Kilpatrick Townsend & Stockton LLP (57) ABSTRACT

Methods and systems are provided for preparing radio-frequency devices for secure distribution. Multiple such radio-frequency devices are received. Each device has an embedded radio-frequency transponder. Each radio-frequency devices is moved sequentially to stations of a preparation device. At a first station, a radio-frequency identification code assigned to the radio-frequency device is encoded to personalize the radio-frequency device with recipient-specific radio-frequency identification data. At a second station, the radio-frequency devices is packaged within a package such that the radio-frequency device within the package is electromagnetically shielded at radio frequencies.

16 Claims, 7 Drawing Sheets

SECURE RFID PACKAGING

CROSS REFERENCE TO RELATED APPLICATION

This application is a nonprovisional of, and claims the benefit of the filing date of, U.S. Prov. Pat. Appl. No. 60/697,288, entitled "SECURE RFID PACKAGING," filed Jul. 6, 2005 by Sunil Dewan, the entire disclosure of which is incorporated herein by reference for all purposes.

BACKGROUND OF THE INVENTION

This application relates generally to radio-frequency ("RF") devices. More specifically, this application relates to security of RFID-device packaging.

An RF device is a device that incorporates electromagnetic technology in the radio-frequency portion of the electromagnetic spectrum to transmit a unique identification signal or data. The specific portion of the spectrum that is used may depend on a particular application, varying from low-frequency RF devices that operate at about several kHz, to higher-frequency RF devices that may operate at GHz levels; the transmission range is greater with higher frequencies, although devices that operate at such frequencies tend to be more costly.

RF devices have recently become popular for use in financial, nonfinancial, and other transactions, being used in lieu of bar codes and magnetic stripes on credit and debit cards. A typical RF device includes an RF transponder that communicates with a transceiver in response to commands transmitted via radio-frequency waves generated by the transceiver. The transceiver may be thought of as a reader, analogous to a bar-code or magnetic-stripe reader. Such a reader may be located, for example, at a retail establishment to permit the holder of the RF device to purchase items and conduct other financial and nonfinancial transactions. Because the transponder in the RF device may be relatively small, it is conveniently integrated into a wide variety of objects rather than being limited to a standard structure, as has tended to be the case for magnetic-stripe cards. For example, RF transponders may conveniently be included in credit cards and other financial cards or instruments, key fobs, jewelry such as bracelets or necklaces, cell-phone covers, and a variety of other types of objects. Financial cards that incorporate RF devices are sometimes referred to as RF or contactless smart cards, and may incorporate various processing and memory components in addition to radio-frequency functions.

While the versatility of RF devices thus provides a diverse array of transaction options, there are also some risks associated with RF devices. One notable risk is the ability for electromagnetic signals to penetrate unsecured packaging. For example, characteristics of an RF device may maliciously be extracted, even from a sealed package that contains the RF device, by activating the transponder using a remote signal in a process sometimes referred to in the art as "sniffing." When the information is extracted by such a process, it may then be used improperly to conduct fraudulent financial transactions.

There is accordingly a need in the art for methods that improve the security of RF devices.

BRIEF SUMMARY OF THE INVENTION

Embodiments of the invention therefore provide methods and systems for preparing radio-frequency devices for distribution. A plurality of such radio-frequency devices are received. Each device comprises an embedded radio-frequency transponder. Each of the radio-frequency devices is moved sequentially to a plurality of stations of a preparation device. At a first station, a radio-frequency identification code assigned to the each of the radio-frequency devices is encoded to personalize the each of the radio-frequency devices with recipient-specific radio-frequency identification data. At a second station, the each of the radio-frequency devices is packaged within a package such that the each of the radio-frequency devices within the package is electromagnetically shielded at radio frequencies.

In some embodiments, a recipient is identified for the each of the radio-frequency devices. At a third station, a package containing the each of the radio-frequency devices is labeled with a mailing address for the recipient.

There are a number of different ways the radio-frequency devices may be packaged in different embodiments. For instance, in one embodiment, the each of the radio-frequency devices is affixed to a carrier printed with metallic ink, and the carrier is inserted in the package. In another embodiment, the package has an interior electromagnetic shield at radio frequencies, such as may be achieved when the interior is printed with metallic ink; the each of the radio-frequency devices may then be packaged by inserting the each of the radio-frequency devices in the package. In still another embodiment, the each of the radio-frequency devices is inserted within a sleeve that includes shielding material that shields an interior of the sleeve from electromagnetic radiation at radio frequencies, with each of the sleeved radio-frequency devices being inserted in the package.

The radio-frequency devices may also be packaged with magnetic-stripe cards in some embodiments. A plurality of magnetic-stripe cards are received. At a third station, an identification of each of the plurality of magnetic-stripe cards is read from the each of the magnetic-stripe cards. The radio-frequency identification code to be assigned to a corresponding one of the radio-frequency devices is determined from the identification of the each of the plurality of magnetic-stripe cards. The magnetic-stripe card corresponding to the each of the radio-frequency devices is packaged with that radio-frequency device within the package.

The methods of the invention may be embodied in a system that comprises a plurality of stations, a controller in communication with the plurality of stations, and a memory coupled with the controller. The memory comprises a computer-readable storage medium having a computer-readable program embodied therein for operating the system to prepare radio-frequency devices for distribution in accordance with the description above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide for automated preparation of RF devices for distribution in secure packaging. In many of the embodiments, existing equipment suitable for the preparation of magnetic-stripe cards may be used without significant modification, even though the RF devices may have different sizes and shapes from magnetic-stripe cards.

Figure 1:
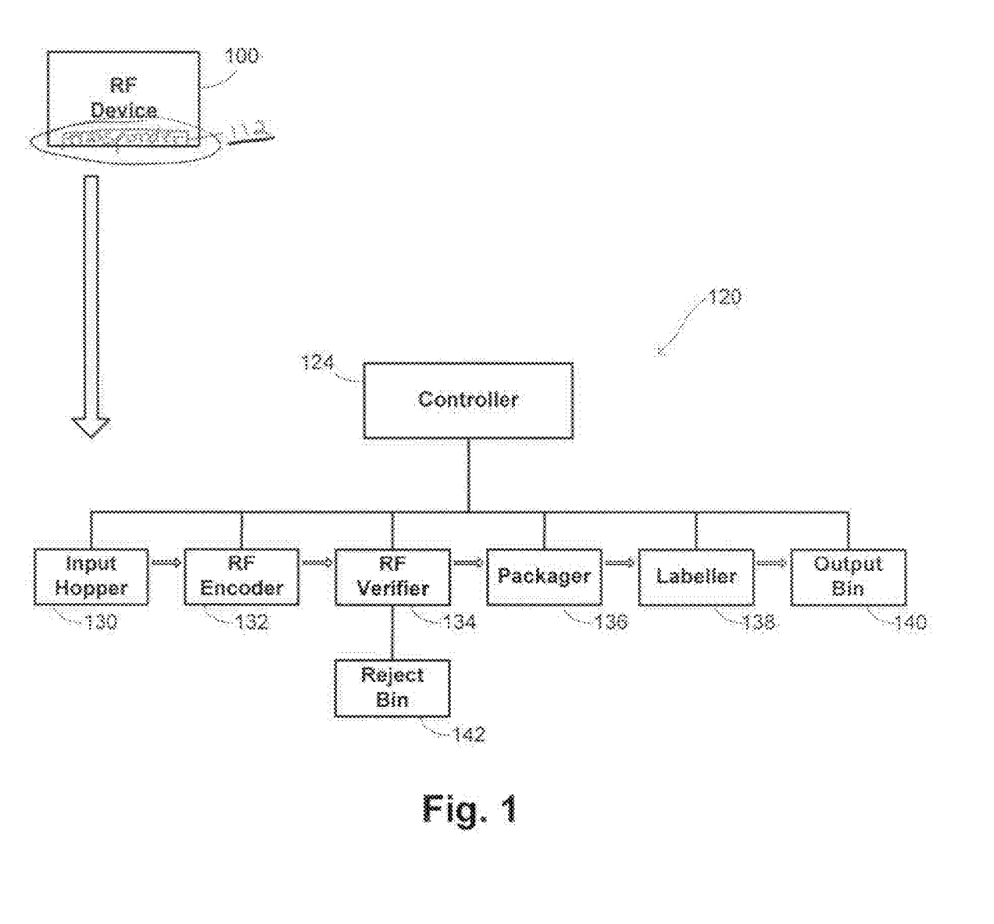
FIG. 1 is a schematic illustration of one embodiment of a system providing automated preparation of RF devices for distribution.
Figure 2:
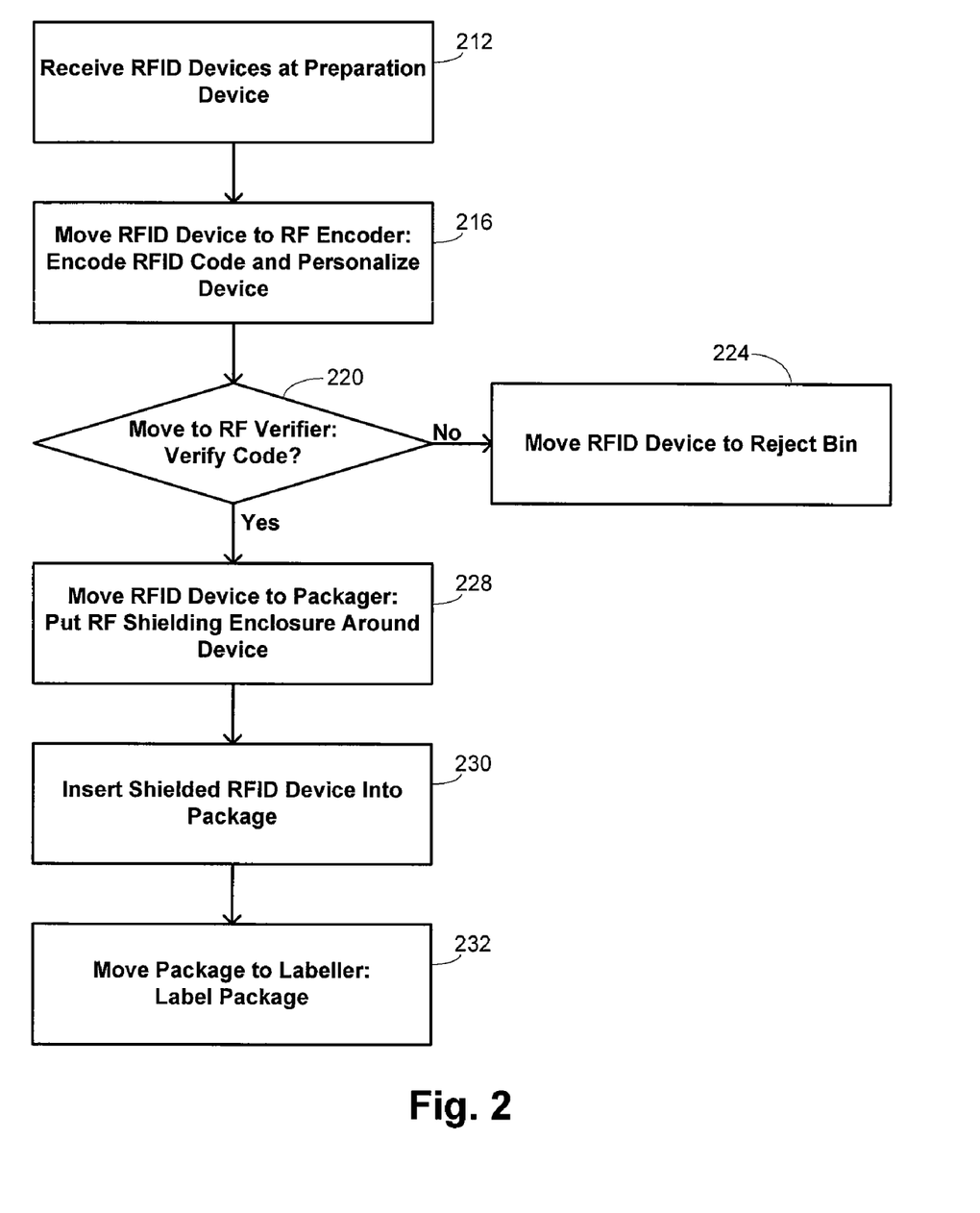
FIG. 2 is a flow diagram illustrating a method for automated preparation of RF devices for distribution using the system of FIG. 1.

An example of one system for preparing RF devices is provided in FIG. 1, which is accompanied by the flow diagram of FIG. 2 illustrating a method using the system of FIG. 1. The description that follows thus makes simultaneous reference to FIGS. 1 and 2. The illustrated embodiments make use of techniques to package the RF device 100, allowing it to be prepared for distribution using existing equipment already adapted for preparation of objects having that size. Typically, a plurality of such devices may be received at a preparation device 120, as indicated at block 212 of FIG. 2. The preparation device 120 may have a plurality of stations that are each adapted to perform a particular function. The operation of each station may be managed by a controller 124 that is also programmed to coordinate the movement of the encapsulating packages to the different stations as part of an automated process. The RF devices may be received by an input hopper 130 of the preparation device 120, from which it may be directed to different stations in accordance with instructions provided by the controller 124. FIG. 1 illustrates one particular sequence of stations to which the RF devices may be directed in a particular embodiment, but this illustration is not intended to be exclusive. In other embodiments, some of the stations may be bypassed, additional stations may be included, or the order in which stations are visited may be changed.

In the illustrated embodiment, each RF device is initially moved to an RF encoder station 132, which is configured to encode the RF device with a particular RF identification code assigned to that device, thereby personalizing the RF device. This station will thus typically include a radio-frequency transceiver and an antenna to allow radio-frequency signals to be exchanged with the transponder 112 of the RF device and to identify the specific device. A database comprised by or accessible by the controller 124 includes an identification of the particular identification code to be assigned to the specific device, allowing that code to transmitted to the transponder 112 with the antenna at the RF encoder station 132 to personalize the RF device as indicated at block 216 of FIG. 2. The database may additionally correlate the assigned RF identification code with a particular individual, such as an anticipated recipient of the device. In some instances, the code may be further correlated with one or more financial accounts to enable the device to be used in providing access to such financial accounts.

In some embodiments, a check may be made to ensure that the RF identification code was correctly written to the transponder 112 by moving the RF device to an RF verifier station 134 as indicated at block 220. This station may also include an antenna and transceiver to allow exchange of radio-signal information with the device's transponder. The transponder is activated at the station, and an identification signal that purports to include the RF identification code is transmitted to the station. A check is made whether the received RF identification code matches the code assigned to that RF device by having the controller 124 check the database records of the assigned code and performing a comparison. In some instances, the RF encoder and RF verifier stations 132 and 134 may be the same station, but in other embodiments they are different stations. If the RF identification code written to the RF device is not successfully verified, the RF device may be moved to a reject bin 142, allowing the device to be discarded in the event that the transponder 112 is defective.

If the RF identification code is verified, the RF device may be moved to a packager station 136 as indicated at block 228. The RF device is shielded with a material that blocks radio-frequency waves, and will thereby prevent the RF device from being sniffed after it has been fully packaged at block 230. There are a number of different ways in which the shielding may be provided. For example, metal-based inks may be printed on a carrier that holds the RF device within its package, or such inks may be printed within the package itself. In other instances, a sleeve that includes shielding material may be slipped over the device before it is packaged at block 230. Interfering with the ability to sniff the RF device in this way advantageously permits the RF device to be packaged and shipped to customers without having to encrypt information. In some embodiments, the package may comprise an envelope, particularly if the device is sufficiently small. The package may be labeled at block 232 by moving it to a labeler 138; in some embodiments, such labeling may be unnecessary, such as where packaging the device provides automatic labeling through an envelope window. The prepared RF device is then moved to an output bin 140, from which the devices may be distributed to customers.

In a particular set of embodiments, usually where the size of the RF devices is small, the RF devices may be provided on a reel. This may be suitable, for example, where the RF devices comprise individual chips. The reel may conveniently be fed through the stations of the preparation device 120, which may additionally include a station equipped to separate the RF devices. For example, such a station could be equipped with a cutting tool to cut the reel between RF devices, advantageously using a known separation distance between devices defined by the structure of the reel.

In some embodiments, it may be desirable to prepare an RF device for distribution in combination with a magnetic-stripe card. Such embodiments may be especially useful, for example, in cases where the RF device is intended to be used in connection with financial transactions, recognizing that many points of sale may be equipped only with more traditional magnetic-stripe readers and not with RF readers. Providing a combination of an RF device, such as a fob, with a magnetic-stripe card gives the recipient the flexibility to choose which instrument to use in a given transaction. At those places equipped with RF readers, the more convenient RF device may be used, but it remains possible to enter into transactions using the same financial accounts by using the magnetic-stripe card if a merchant is equipped only to accept magnetic-stripe cards.

Figure 3:
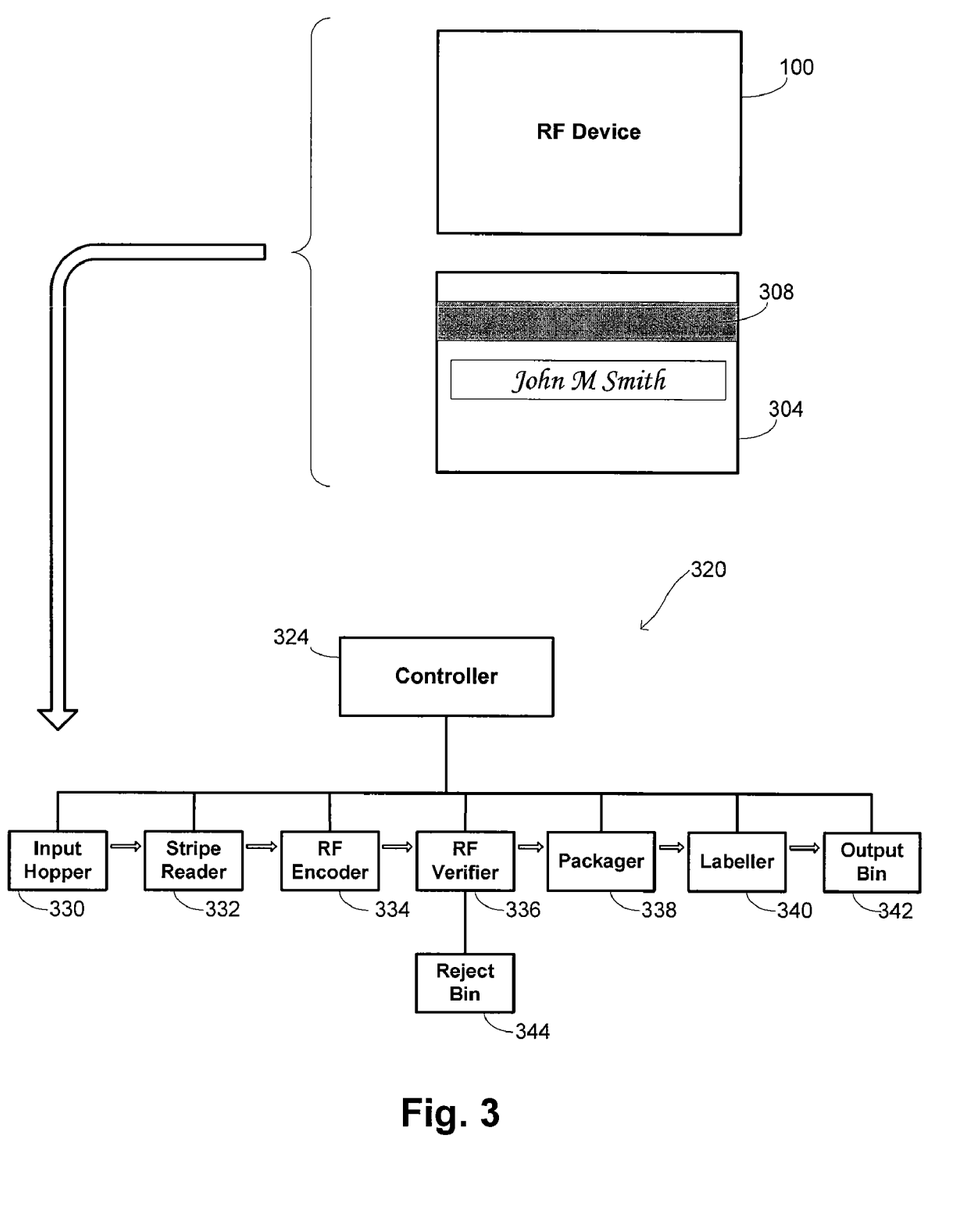
FIG. 3 is a schematic illustration of another embodiment of a system providing automated preparation of RF devices for distribution.
Figure 4:
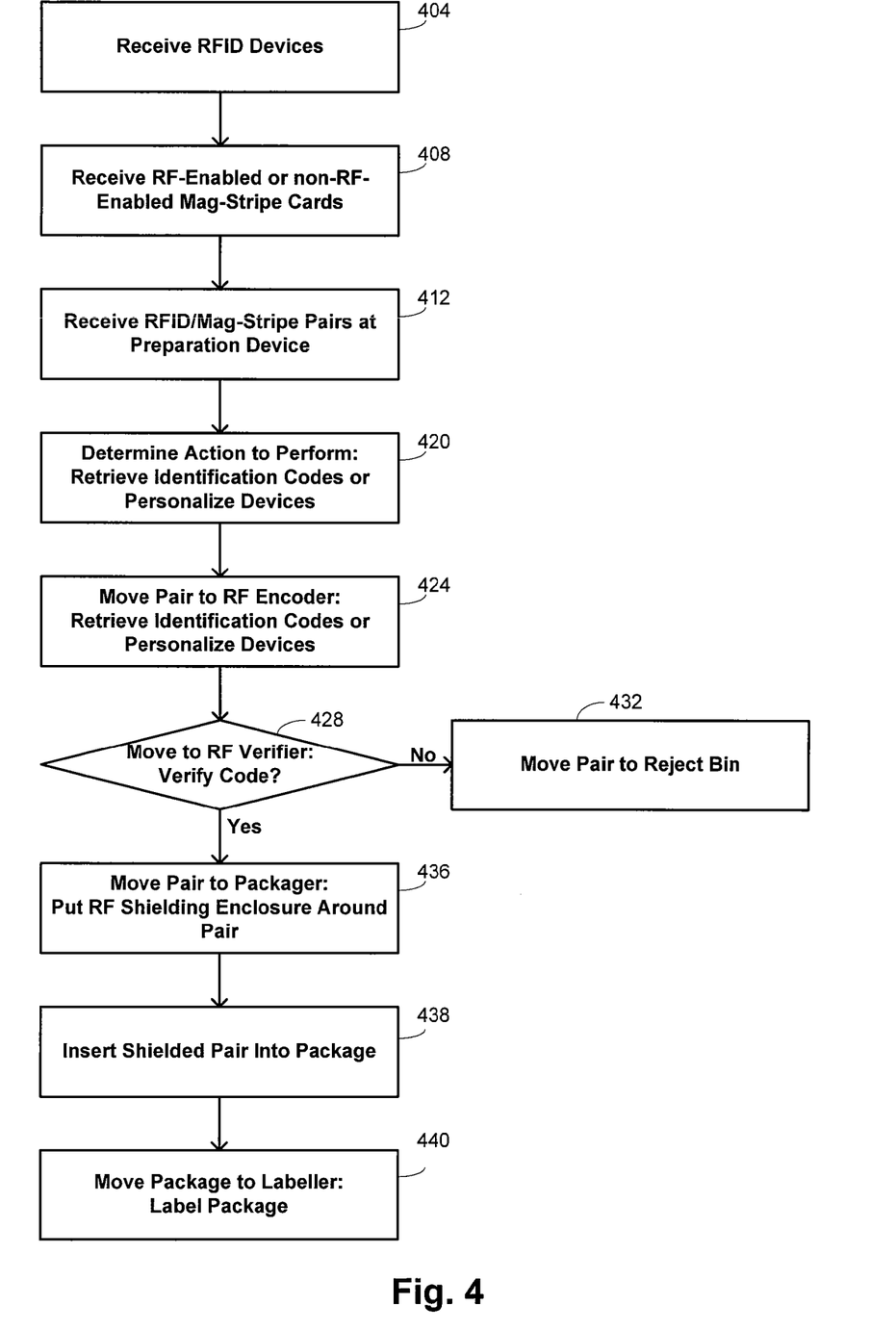
FIG. 4 is a flow diagram illustrating a method for automated preparation of RF devices for distribution using the system of FIG. 3.

Thus, FIG. 3 provides an example of a system equipped to prepare RF devices in combination with magnetic-stripe devices. It is accompanied by the flow diagram of FIG. 4 illustrating a method using the system of FIG. 3. The description that follows thus makes simultaneous reference to FIGS. 3 and 4. As indicated at blocks 404 and 408 of FIG. 4, the RF devices 100 and the magnetic-stripe devices 304 are received. The illustration of the magnetic-stripe card 304 in FIG. 3 shows the back of such a card where the magnetic stripe 308 and a signature of a cardholder are provided.

The RF devices and the magnetic-stripe cards are paired as indicated in FIG. 3 so that pairs comprising an RF device and a magnetic-stripe card may be received by the preparation device 320 at block 412 of FIG. 4. Similar to the preparation device shown in FIG. 1, the preparation device 320 may have a plurality of stations at which specific functions may be performed, with functions and movement of the pairs between stations being managed by a controller 324. The sequence of stations illustrated in FIG. 3 is not intended to be limiting, nor is it intended to indicate exclusively which functions may be performed on the RF-device/magnetic-stripe-card pairs.

The pairs may be received at an input hopper 330 and may be moved together as a pair through the different stations as indicated in the embodiment of FIG. 4, or may be moved along separate paths with the controller 324 tracking the positions of the separate elements of each pair. At block 420, a determination is made whether to retrieve identification codes or to personalize devices. For example, the RF identification code corresponding to the magnetic-stripe code may be extracted from the magnetic-stripe card and encoded onto the RF device at block 424 to personalize the device by moving the pair to an RF encoder station 334. Such a station includes a transceiver and antenna to enable radio communications with the transponder of the RF device so that the corresponding code may be written to the RF device. In some instances, a verification may be performed at block 428 to ensure that the code is written to the device correctly. In some instances, this verification may be performed at the same station, but in other embodiments it is performed by moving the pair to a separate RF verification station 336, also equipped with a transceiver and antenna to enable exchange of radio-frequency information. The verification is performed by reading the RF identification code from the RF device and comparing it with records of the assigned RF identification code accessible to the controller. If the code is not verified, the RF-device/magnetic-stripe-card pair may be moved to a reject bin 344 as indicated at block 432.

If the code is verified, the pair may be moved to a packager station 338 at block 436. At the packager station, the RF device is shielded from being sniffed after it is inserted into a package at block 438. As described above, there are a number of different ways that such shielding may be provided in different embodiments, including the use of metal-based inks printed on a carrier that holds the pair and/or printing such inks within the package itself. In other instances, a shielding sleeve may be slipped over the pair before they are packaged at block 438. In one embodiment, the pair are conveniently packaged within an envelope for delivery to a recipient. The packaged pair may conveniently be deposited in an output bin 342 by the preparation device, from which it may be distributed to the recipient.

Figure 5:
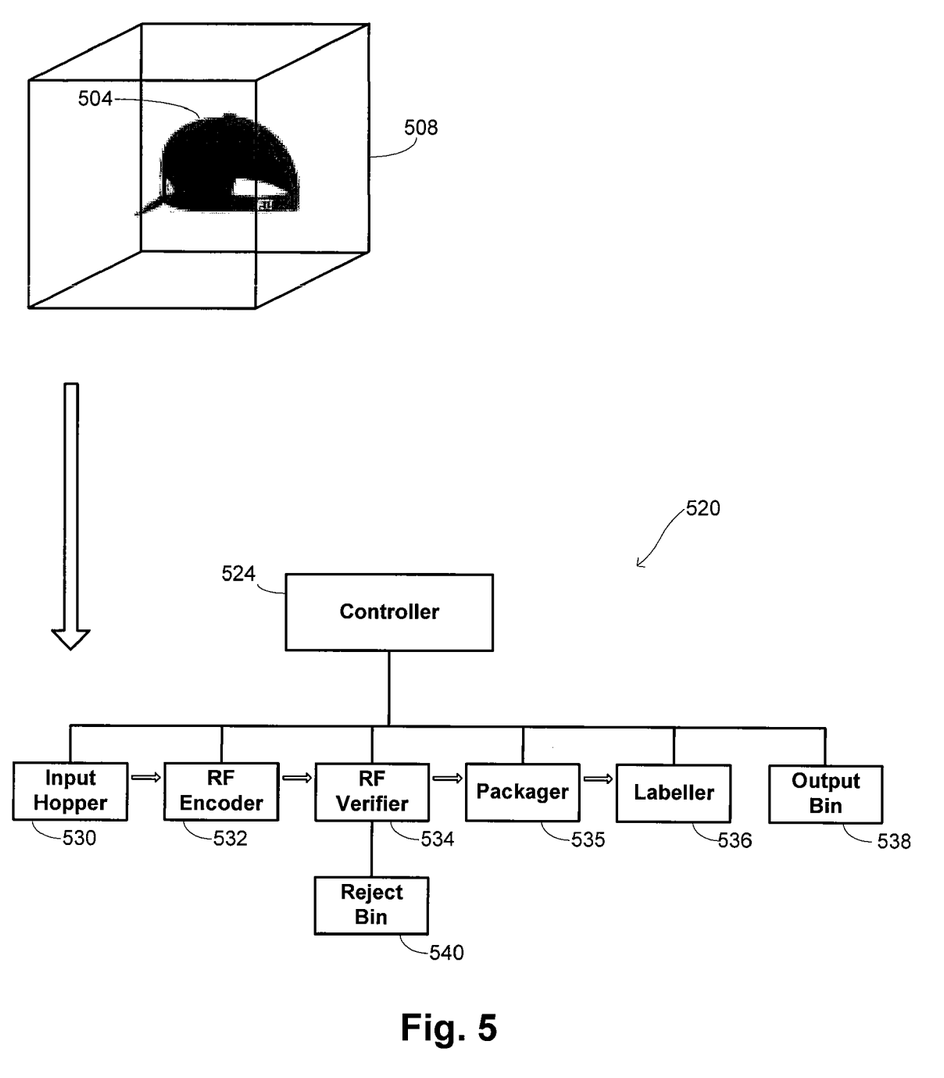
FIG. 5 is a schematic illustration of a further embodiment of a system providing automated preparation of RF devices for distribution.
Figure 6:
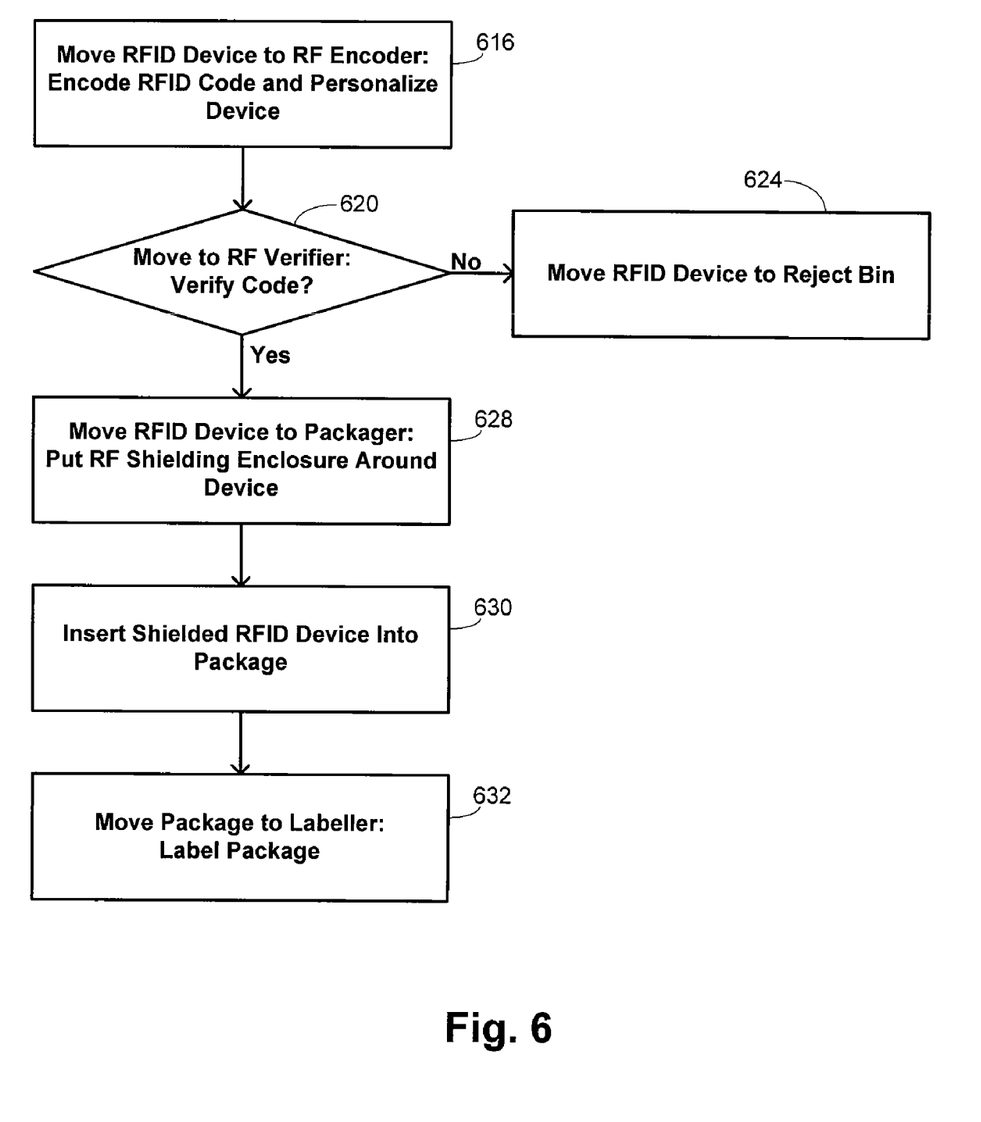
FIG. 6 is a flow diagram illustrating a method for automated preparation of RF devices for distribution using the system of FIG. 5.

In still other embodiments, the methods of the invention may be applied to RF devices embedded in still other types of objects. This includes RF devices that are provided in a variety of novelty-type items, the specific example of a baseball cap 504 being illustrated in FIG. 5. Such a device could be provided for sale to children at an amusement park, enabling the child to wear the cap and have value decremented automatically as he partakes in amusements. The form of the devices is virtually endless and may include such things as necklaces, bracelets, shoes, teddy bears, etc. FIG. 5 provides an illustration of a system that is suitable for preparing such RF devices, and is accompanied by the flow diagram of FIG. 6 illustrating a method for using the system of FIG. 5. The following description therefore makes reference to both FIGS. 5 and 6.

The example used for the RF device in FIG. 5 is a baseball cap 504, which will be enclosed within a box 508. More realistically, the box enclosure 508 would additionally contain packing material to protect the item. As indicated at block 616 of FIG. 6, the RF device is received at an RF encoder 532 from an input hopper 530 that form part of a preparation device 520. To accommodate a larger size for certain devices, the preparation device 520 may be designed to accommodate objects having certain predefined sizes and shapes, although in other embodiments a variation of sizes may be accommodated by using position-recognition techniques, such as cameras, position sensors, and the like. The sequence of stations illustrated for the preparation device 520 in FIG. 5 is not intended to be limiting; in other embodiments, more or fewer stations may be provided and/or the stations may be encountered in a different order. A controller 524 is provided to coordinate movement of the enclosures and to control operations performed on the enclosures at the different stations.

Thus, similar to other embodiments described above, the RF device is encoded with an assigned RF identification code as determined by the controller 524 to personalize the device at block 616. In embodiments where a verification is performed to ensure that the correct RF identification code has been written to the RF device, the device may be moved at block 620 to an RF verifier station 534 that is also equipped with a transceiver and antenna for communication with a transponder in the RF device. The RF verifier station 534 requests identification of code written to the RF device so that it may be compared by the controller 524 with the code that was to have been assigned. In other embodiments, the verification and encoding functions may be performed at a single station. If the verification fails, the device may be moved at block 624 to a reject bin. If the verification confirms that the correct code has been written, however, the device may be moved at block 628 to a packager 535 where the device is shielded from RF frequencies. Such shielding may be provided in a number of different fashions, including using metal-based inks printed on a carrier that holds the RF device, printing metal-based inks within the package itself, enclosing the device within a sleeve that is opaque at RF frequencies, and the like. The device is inserted into the package at block 630 and moved to a labeler 536 for labeling at block 632. The labeled enclosure may then be directed to an output bin 538, from which it may be distributed to a recipient.

Figure 7:
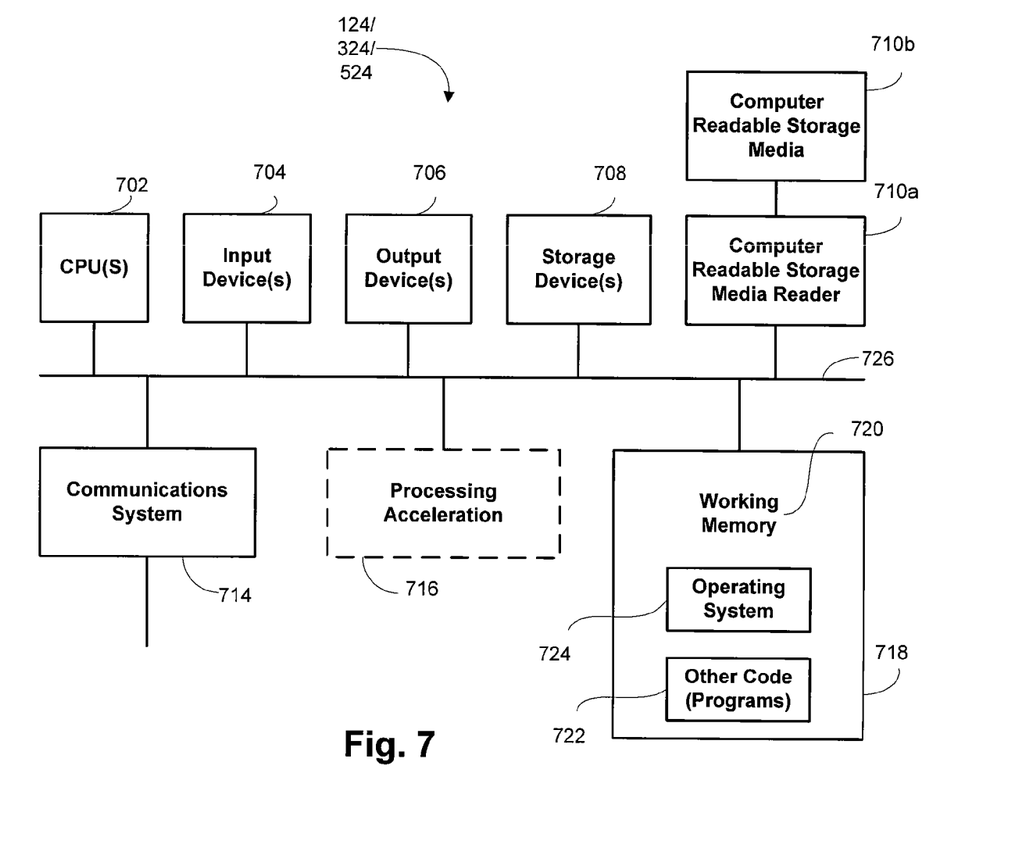
FIG. 7 is a schematic illustration of a controller that may be used with the automated systems in embodiments of the invention.

FIG. 7 provides a schematic illustration of a structure that may be used to implement the host system controller 124, 324, or 524 in any of the preceding embodiments. FIG. 7 broadly illustrates how individual system elements may be implemented in a separated or more integrated manner. The controller is shown comprised of hardware elements that are electrically coupled via bus 726, including a processor 702, an input device 704, an output device 706, a storage device 708, a computer-readable storage media reader 710a, a communications system 714, a processing acceleration unit 716 such as a DSP or special-purpose processor, and a memory 718. The computer-readable storage media reader 710a is further connected to a computer-readable storage medium 710b, the combination comprehensively representing remote, local, fixed, and/or removable storage devices plus storage media for temporarily and/or more permanently containing computer-readable information. The communications system 714 may comprise a wired, wireless, modem, and/or other type of interfacing connection and permits data to be exchanged with other devices. Records of assigned RF identification codes, lookup tables for corresponding magnetic-stripe cards, and the like may be stored on the storage device 708, or may accessible from remote storage through the communications system 714.

The controller also comprises software elements, shown as being currently located within working memory 720, including an operating system 724 and other code 722, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of preparing a novelty item for distribution, the method comprising:
   receiving a novelty item that is worn by a user after distribution, the novelty item comprising an embedded radio-frequency transponder that allows value to be automatically decremented from an account as the user wears the novelty item;
   sequentially moving the novelty item to a plurality of stations of a preparation device;
   encoding, at a first station, the radio-frequency transponder with a radio-frequency identification code to personalize the novelty item with financial account information of a specific card holder to enable the novelty item to be used in providing access to the card holder's financial account;
   packaging, at a second station after the encoding step, the novelty item within a package such that the novelty item within the package is shielded from electromagnetic radiation during shipping, wherein the frequency range of the shielded electromagnetic radiation is at least the frequency range within which the radio-frequency devices operate, and wherein the radio frequency devices remain entirely enclosed within the package during shipping;
   receiving a magnetic-stripe card of the card holder;
   reading, at a third station, an identification of the magnetic-stripe card from the magnetic-stripe card; and
   determining the radio-frequency identification code to be encoded onto the radio-frequency transponder from the identification of the magnetic-stripe card,
   wherein packaging the novelty item within the package further comprises packaging the magnetic-stripe card.

2. The method recited in claim 1 further comprising:
   identifying a recipient for the novelty item; and
   labeling, at a third station, a package containing the novelty item with a mailing address for the recipient.

3. The method recited in claim 1 wherein packaging the novelty item within the package comprises:
   affixing the novelty item to a carrier printed with metallic ink; and
   inserting the carrier in the package.

4. The method recited in claim 1 wherein:
   the package has an interior electromagnetic shield at radio frequencies; and
   packaging the novelty item comprises inserting the novelty item in the package.

5. The method recited in claim 4 wherein the interior is printed with metallic ink.

6. The method recited in claim 1 wherein packaging the novelty item within the package comprises:
   inserting the novelty item within a sleeve that includes shielding material that shields an interior of the sleeve from electromagnetic radiation at radio frequencies; and
   inserting the sleeved novelty item in the package.

7. The method recited in claim 1 wherein the radio-frequency identification code is unencrypted.

8. The method recited in claim 1 wherein packaging the novelty item comprises:
   affixing the novelty item and the magnetic-stripe card to a carrier printed with metallic ink; and
   inserting the carrier in the package.

9. A system comprising:
   a plurality of stations;
   a controller in communication with the plurality of stations; and
   a memory coupled with the controller, the memory comprising a computer-readable storage medium having a computer-readable program embodied therein for operating the system to prepare a novelty item for distribution, the novelty item being worn by a user after distribution, the computer-readable program including:
   instructions to receive the novelty item, the novelty item comprising an embedded radio-frequency transponder that allows value to be automatically decremented from an account as the user wears the novelty item;
   instructions to move the novelty item to the plurality of stations;
   instructions to receive a magnetic-stripe card at a first station;
   instructions to read, at the first station, an identification of the magnetic-stripe card from the magnetic-stripe card;
   instructions to determine from the identification of the magnetic-stripe card, a radio-frequency identification code to be encoded onto the radio-frequency transponder;
   instructions to encode, at the first station, the radio-frequency transponder with the radio-frequency identification code to personalize the novelty item with financial account information associated with the magnetic-stripe card to enable the novelty item to be used in providing access to the financial account associated with the magnetic-stripe card; and
   instructions to package, at a second station after the encoding step, the novelty item and the corresponding magnetic-stripe card within a package such that the novelty item within the package is electromagnetically shielded at radio frequencies during shipping.

10. The system recited in claim 9 wherein the instructions to package the novelty item within the package comprise:
    instructions to affix the novelty item to a carrier printed with metallic ink; and
    instructions to insert the carrier in the package.

11. The system recited in claim 9 wherein:
the package has an interior electromagnetic shield at radio frequencies; and
the instructions to package the novelty item comprises instructions to insert the novelty item in the package.

12. The system recited in claim 11 wherein the interior is printed with metallic ink.

13. The system recited in claim 9 wherein the instructions to package the novelty item within the package comprises:
instructions to insert the novelty item within a sleeve that includes shielding material that shields an interior of the sleeve from electromagnetic radiation at radio frequencies; and
instructions to insert the sleeved novelty item in the package.

14. A method of preparing a novelty item for distribution, the method comprising:
receiving a novelty item that is worn by a user after distribution, the novelty item comprising an embedded radio-frequency transponder that allows value to be automatically decremented from an account as the user wears the novelty item;
sequentially moving the novelty item to a plurality of stations of a preparation device;
receiving a magnetic-stripe card;
reading, at a first station, information from the magnetic-stripe card, wherein the information comprises a radio-frequency identification code to be encoded onto the radio-frequency transponder;
extracting the radio-frequency identification code from the magnetic-stripe card;
encoding, at a second station, the radio-frequency transponder with the extracted radio-frequency identification code to personalize the novelty item with financial account information associated with the magnetic-stripe card to enable the novelty item to be used in providing access to the financial account associated with the magnetic-stripe card;
affixing the magnetic-stripe card and the novelty item to a carrier printed with metallic ink; and
packaging, at a third station after the encoding step, the carrier printed with metallic ink within a package such that the novelty item within the package is shielded from electromagnetic radiation at radio frequencies during shipping.

15. The method recited in claim 1 further comprising:
using a camera at one or more of the stations, the camera being configured to accommodate objects of various size during packaging of the novelty item.

16. The system recited in claim 9, wherein one or more of the plurality of stations comprises a camera, wherein the camera is configured to accommodate objects of various size in preparing the novelty item for packaging.

* * * * *